O. JAHNKE.
FLANGE JOINT.
APPLICATION FILED FEB. 19, 1909.
1,004,270.
Patented Sept. 26, 1911.
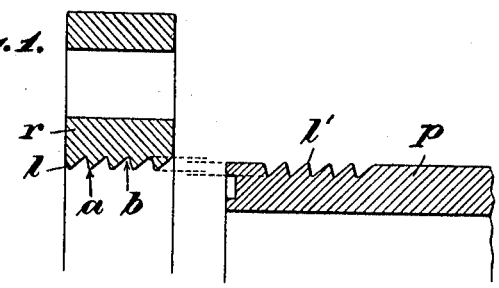
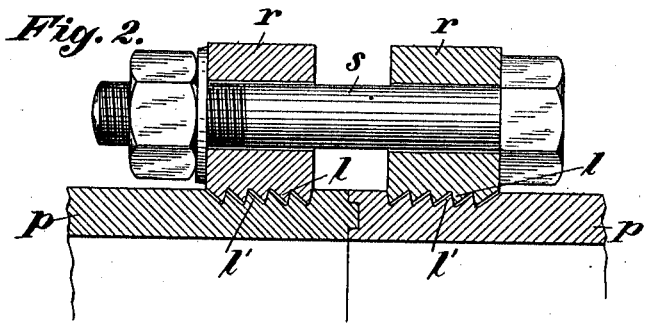
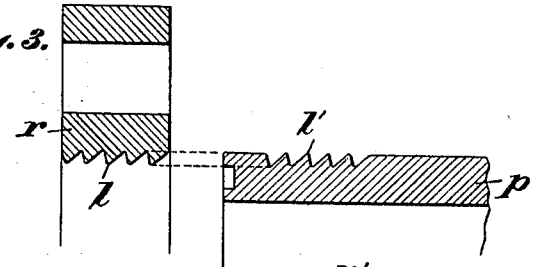
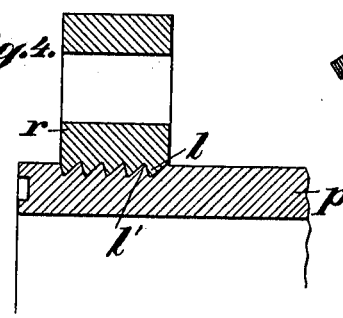
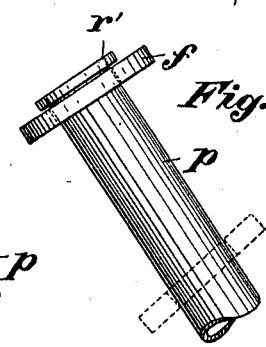
WITNESSES
W. P. Burke
Crm. G. Smith
INVENTOR
Otto Jahnke
BY
ATTY.

UNITED STATES PATENT OFFICE.

OTTO JAHNKE, OF KATTOWITZ, GERMANY.

FLANGE-JOINT.

1,004,270.     Specification of Letters Patent.     Patented Sept. 26, 1911.

Application filed February 19, 1909. Serial No. 478,898.

*To all whom it may concern:*

Be it known that I, OTTO JAHNKE, engineer, subject of the German Emperor, residing at Kattowitz, Silesia, in the Empire of Germany, have invented new and useful Improvements in Flange-Joints, of which the following is a specification.

The present invention relates to wrought iron pipes and particularly to improved flange-joints for the same.

A primary object of the invention is to provide an improved attachment of fixed and loose flanges on wrought iron pipes, particularly those of large diameter such as are usual, for example, as water pipes, for turbine plants and the like, and on which the flanges were generally attached heretofore by welding, flanging the ends of the pipes, or, in so far as it was a matter of pipes of small diameter, by screwing them on by means of screw-threads, or also by firmly rolling the end of the pipe into the flange.

Owing to the mode of attaching flanges by shrinking according to the present invention, the front ends of the pipes remain free for the arrangement of closures, the pipes being provided on their exterior surfaces with annular grooves at the places where the flanges are attached, to which grooves suitable annular ribs on the ring which is to be placed on the pipe correspond. The diameter and height of the ribs correspond to the diameter and depth of the grooves or channels in the pipe, so that while it is cold the ring cannot be placed on the end of the pipe. If the ring is heated to redness, however, it will expand and its diameter will become larger, and since the height of the ribs on the ring are proportioned corresponding to this expansion, the suitably heated ring can be pushed onto the end of the pipe and be so proportioned that each rib of the ring is situated opposite a groove in the pipe. When the ring cools it contracts and its diameter becomes smaller; the ribs of the ring then engage in the grooves in the pipe, and, according as the ribs and grooves have play or not after the ring has cooled, either a flange free to rotate on the pipe or a flange fixed immovably on the latter is obtained; in the former case, however, the flange is movable on the pipe axially only the small amount of the play, in consequence of the ribs engaging in the grooves in the pipe.

In order that the invention may be clearly understood reference will be made to the accompanying drawing in which several embodiments are represented by way of example, and in which:

Figure 1 is a cross-section showing part of one end of a pipe and a ring not yet contracted onto the same, whereas Fig. 2 is a like view of two loose flanges shrunk onto two pipes; Fig. 3 is a cross-section showing part of one end of a pipe and a ring which is to form a fixed flange not yet contracted onto the pipe, whereas Fig. 4 is a like view showing the latter ring shrunk firmly onto its pipe, and Fig. 5 is a diagram more fully explained hereafter.

Referring to the drawing, Fig. 1 shows part of an end of a pipe $p$ and a ring $r$ not yet shrunk onto it. As clearly shown in the figure, the ring can not be placed on the end of the pipe unless the ring is made larger, which can only be done by heating it. Also it will be readily understood from the figure that the diameters of the ribs $l$ on the interior face of the ring are rather larger both at the points $a$ and in the troughs $b$ of the grooves than the corresponding diameters of the ribs $l'$ on the pipe itself.

Fig. 2 illustrates an assembled flange-joint having shrunk loose flanges $r$ of the kind represented in Fig. 1. Both the loose flanges or rings $r$ are secured from moving longitudinally of the pipe by the mutual engagement of their ribs $l$ with the ribs $i'$ of the pipe $p$, whereas each ring is revoluble on the pipe before it is secured to another ring by a screw-bolt $s$, since there is sufficient play for such movement between the two groups of ribs $l$ and $l'$.

Fig. 3 is a cross-section showing part of an end of a pipe $p$ and part of a ring $r$, in which the corresponding diameters of the ribs $l$ and $l'$ are equal. If this ring after being heated suitably is shrunk onto the pipe, the reciprocal positions of flange and pipe clearly shown in Fig. 4 are obtained, namely the ring $r$ which here forms the fixed flange is immovable in every direction on the pipe $p$ and consequently cannot rotate since the ribs $l$ and $l'$ engage one another tightly on both sides without play.

Fig. 5 shows a pipe $p$ on which a ring $r'$ provided with ribs has been fastened firmly by shrinking in the above described manner; a loose back flange $f$ is also provided on the pipe. This loose back flange is normally held in position in known manner against the fixed ring $r'$, but is able to slide down the pipe into the position shown in dotted lines, as soon as the pipe is placed into a slanting or vertical position.

As some of the advantages of the constructional forms according to the invention the following may be mentioned:

1. The front faces of the ends of the pipes can be used to their full extent for providing closures for producing a tight joint.

2. Rings can be shrunk onto the pipe without it being necessary, as heretofore, to previously strengthen the ends of the pipe, to flange the latter, to heat them for shaping them otherwise, or to weld them.

3. A loose flange revoluble in a plane at right angles to the pipe or a fixed flange can be obtained as desired, according as clearance is or is not provided when proportioning the ribs in the ring and the grooves in the pipe.

4. The flange made in this manner loose on the pipe has the advantage, as compared with known constructional forms, that it replaces a revoluble back flange but is held fast in the longitudinal direction of the pipe and thus cannot slide down when the pipes are being erected slantwise or vertically. The sliding down of the loose back flanges customary heretofore generally gives rise to the most serious troubles when erecting the pipes, deformation of the pipes and rings being not impossible when such troubles are being removed. For example, if on a pipe of large diameter which is to be placed slantwise or vertically, the loose back flange has slid into the position shown in dotted lines in Fig. 5 while the pipe was being placed into position, in consequence of the great weight of the flange, which may be as much as 600 kilograms, there are very great difficulties in getting it loose again. Very frequently the back flange becomes fixed so firmly that it can only be moved with violent blows of the hammer which break the ring and deform or injure the pipe. If however the conditions allow the arrangement of such a loose back flange, as for example with pipes placed horizontally, the ring $r'$ forming abutment for the loose back flange $f$ can be shrunk firmly onto the pipe according to the herein described method as shown by dotted lines in Fig. 5.

5. The pipe-joint can be made so simply and easily that the cost of construction is reduced by about one half.

What I claim as my invention and desire to secure by Letters Patent is:

In a flange joint, the combination of a pipe having a plurality of tooth-shaped annular grooves cut into the plain outer surface adjacent its end, with a ring having corresponding toothed-shaped annular ribs in its interior face adapted to engage the grooves of the pipe when the ring is shrunk onto said pipe, substantially as described.

In testimony whereof I have signed my name to this specification in the presence of two subscribing witnesses.

OTTO JAHNKE.

Witnesses:
 EARNST KATZ,
 ERNST BLEISCH.

---

Copies of this patent may be obtained for five cents each, by addressing the "Commissioner of Patents, Washington, D. C."